United States Patent Office 3,252,026
Patented May 17, 1966

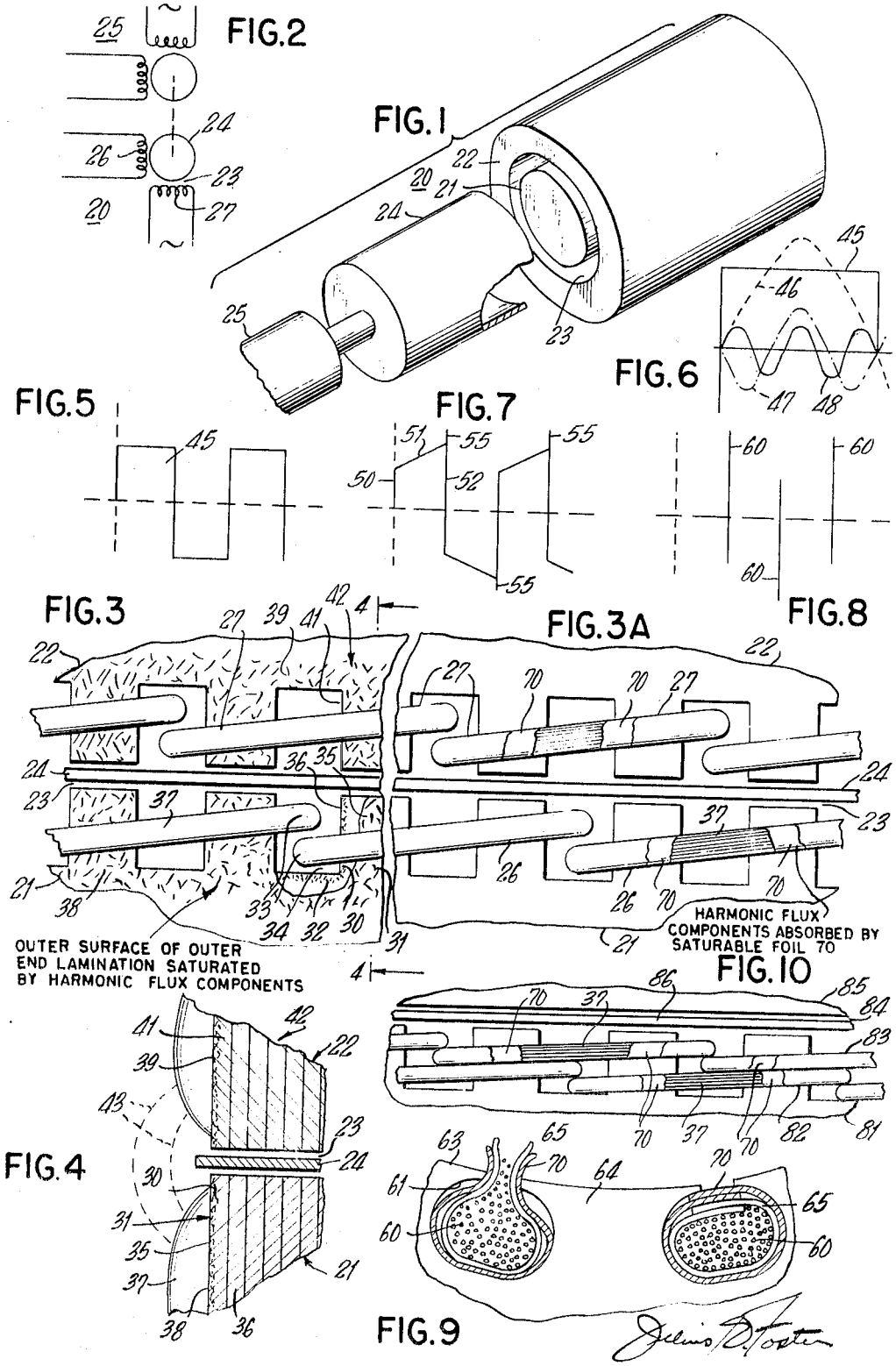

3,252,026
TACHOMETER GENERATOR WITH SUPPRESSED
SPURIOUS QUADRATURE VOLTAGE EFFECTS
Julius E. Foster, 2431 Webb Ave., Bronx, N.Y.
Filed June 28, 1963, Ser. No. 296,416
17 Claims. (Cl. 310—171)

This invention relates to tachometer or rate generators, in which the usual spurious quadrature voltage effects, caused by harmonic flux components of the flux field, are suppressed, thereby to eliminate the usual quadrature null or zero error voltage.

This application is a continuation-in-part of my copending application Serial No. 783,738 filed December 30, 1958, allowed November 2, 1962, now abandoned.

Tachometer generators are dynamo-electric devices for generating an electromotive force in a stationary stator winding, that bears a direct linear relationship to the angular velocity of the rotor part of the generator.

The tach generator construction usually includes a primary or input stationary winding distributed in radial slots of a primary cylindrical stator core that is concentric with the axis of rotation. A secondary core is concentrically disposed around the primary core and supports a secondary or output distributed stationary winding. The secondary winding is angularly spaced with respect to the primary winding by an angle of 90 electrical degrees, so that the secondary winding is in quadrature electrical spacing from the primary winding, and is intended not to be energized from the primary winding during stationary conditions of the generator.

The two stator cores are separated by a narrow cylindrical air gap, within which a rotor, in the form of a cup, is driven by an associated motor or other device at the speed which is to be measured. The rotor cup serves as the energy coupling or transfer element between the two windings, and its rotation determines the voltage generated in the output winding of the tach generator.

In another construction, both windings are disposed on one inner core, also in electrical quadrature spacing, within the inner diametrical limits of the rotor cup. A stationary outer core, encircling the cup, serves to provide the magnetic return path for the flux from the inner core, and such outer core defines the outer limit of the air gap around the inner core. The main flux field from the primary winding crosses this air gap through the wall of the rotor cup.

The tach generator is essentially a transformer with two stationary windings in electrical quadrature relation, whose electro-magnetic coupling is controlled by the rotatable cup. The cup is of non-magnetic material. When the cup is at rest, it does not serve to couple the windings, and does not transfer any energy between them. However, when the cup rotates, it transfers energy from the primary winding to the secondary winding.

In an ideal tach generator, no voltage or electro-motive force would be induced in the secondary winding while the rotor cup is at rest. The original disposition of the secondary winding in electrical quadrature position relative to the primary winding, is intended to assure that no electromotive force will be generated in the secondary winding, from the primary winding when the generator rotor is at rest and the cup is not moving between the two windings.

However, in conventional tachometer generators, because of the difficulty of actually controlling the disposition of the paths of travel of the entire electro-magnetic flux field from a winding, some components of the flux field from the primary winding induce an undesired spurious electromotive force in the secondary winding, even while the rotor cup is at rest.

These spurious voltages are, to a great extent, due to harmonic components of the magnetic flux field of the primary winding. Such harmonic components of the flux field result from the nature of the winding distribution.

In the tachometry generator here contemplated, the energy is transferred through the medium of an alternating electro-magnetic flux field. To achieve the optimum desired relationship between such a flux field and its effect, the flux field should be sinusoidal. However, because such a flux field must necessarily be established by windings or coils that are not continuous in their disposition and effect, the flux field portions or components are individually mathematically discontinuous or sudden, in steps, and are generally characterized as being of rectangular or square wave shape.

A step or square wave as a mathematical function is mathematically defined by a Fourier series expansion consisting of a sinusoidal fundamental frequency term and a series of harmonic terms that represent multiple frequency sinusoidal components, all of which when added together synthesize or form the square wave as the total or sum of the entire Fourier series.

In dynamo-electric apparatus, the windings, or coils constituting the windings, are laid in slots in a core of magnetizable material such as iron or steel. Electrical currents traversing the windings, or coil sides, in passage, develop magneto-motive forces and consequent magnetic flux fields to magnetize the core. The usual distribution of the winding, or of the coil sides, in the associated supporting core, is such as to form a magnetic flux field that must take a square wave form in its values.

Consequently, the square wave flux field contains, and must unavoidably contain, harmonic components corresponding to the several harmonic terms of the Fourier series that defines a wave of that shape. Moreover, those harmonic components must exist in the same ratio or amplitude relationship as defined by the corresponding terms of that Fourier series.

Thus, an energizing current when supplied to the winding must supply not only energy to develop the flux field component for the fundamental frequency that is to accomplish the desired work, but must also supply energy to develop the several flux field components of the several harmonic frequencies corresponding to the Fourier series terms, even though they are not wanted. Consequently, the energizing current must include magnetizing current components to magnetize the core body with magnetic fluxes corresponding not only to the wanted fundamental frequency but also to the uwanted harmonic frequencies.

The unwanted harmonic frequency components of magnetizing current and of the consequent flux field are detrimental. But, because of the unavoidable type of winding and coil distribution and the consequent form of flux field formation, those undesired harmonic components are present and they cause the existence of detrimental other effects.

In the core supporting the primary winding, the harmonic flux components saturate the tooth edges and core along the slot containing the coil sides. Consequently, the core body area is reduced that is to be available to the main or fundamental flux component, and more magnetizing current is needed.

One of the most troublesome errors in a tachometer generator is a spurious quadrature voltage. The proper operation of the tachometer generator depends upon the production of a true quadrature voltage in the secondary winding by the energy-transferring operation of the rotating cup. The spurious quadrature voltage is caused by the frequency-modulation effects resulting from intermodulation of the various harmonic flux components, and therefore the spurious quadrature voltage is present in the output, even while the cup is at rest, and then throughout the full range of speed of the rotor cup.

Moreover, during operation of the cup, the flux field of the primary winding is effectively shifted and tilted, so the form of the flux field is changed from square wave, or step form, to trapezoidal form, which is essentially a ramp function superimposed on the step function. The ramp function is also represented by a Fourier series of fundamental and harmonics, and terminates in a unit impulse function that causes the coil end turns of the primary winding to act as antennas and to radiate energy to the end turns of the secondary or output winding.

The harmonics are thus the cause of excessive losses and of troublesome errors that prevent the induction of a linear output voltage that is a direct function of the cup speed. Present conventional methods for eliminating spurious quadrature voltages require individual testing of each tachometer generator to determine its idiosyncrasies, and then apply a cure to the symptoms rather than to the cause.

The present invention is directed to a new philosophy shown embodied in a construction and directed to a method of operation in electrical apparatus that will substantially reduce the magnetizing current needed for the harmonic flux components and that will isolate those harmonic flux components and separate them from the regular magnetic circuit path desired for the fundamental flux field. As a consequence, the full benefit of the fundamental flux field energy is obtained without interference from spurious voltage effects otherwise caused by the harmonic flux components.

The primary object of this invention therefore is to provide a novel tach generator in which the ideal linearity characteristics may be more closely achieved.

A further object of this invention is to provide a novel principle of construction and design for a tachometer generator whereby the harmful and spurious effects of various types of electrical harmonics may be substantially suppressed and eliminated, or the harmonic flux components diverted to a path or region where they will have no harmful effect on the intended or desired operation of the apparatus.

Another object of the invention is to keep the harmonic flux components out of the air gap and to prevent them from interlinking with certain predetermined operating windings that would otherwise be interlinked.

Another object of the invention is to keep the harmonic flux components out of the core body for the operating windings.

Another object of the invention is to provide a tach generator construction in which only the fundamental flux component is permitted to cross the air gap, and all other flux components are confined to a restricted and ineffective path to prevent possible harmful interlinkage with the operating windings.

These objects are generally achieved by establishing an auxiliary magnetic path for the harmonic flux components and by thus diverting the harmonic flux components from the main path intended for the main operating flux field.

For maximum benefit, the harmonics should be kept out of the core structure and also should be kept out of an air gap, where the operating flux path includes such air gap. In some cases, the partial benefits derived from keeping the harmonics out of the core alone or out of the air gap alone may be sufficient.

Thus, different modifications may be employed, to utilize the invention in full or in part.

These objects are achieved in one modification by wrapping all the coil sides of each coil in a strip or sheet of softly magnetizable foil having a thickness of about 0.001 inch, with one or more layers as needed to provide a closed magnetic circuit that will saturate by the harmonic flux content of the magnetic flux field from the primary winding. In order to achieve the full benefit of this invention, the entire coil including coil sides in the slot and coil end turns are enwrapped in the magnetic foil.

In dynamo-electric devices with small coil slots, some inconvenience is experienced in the placement and handling of such thin foil.

To avoid this difficulty, a further feature of this invention is to utilize the insulating material which will usually be used for the coil slots, and to use that insulating material as a carrier for supporting and handling and placing the magnetizable material that is to provide the auxiliary magnetic path for the harmonic flux components. Such insulating material may be treated to embody a layer of magnetizable material to serve the function of the thin foil. Thus, the insulating material which is easily handled in its conventional way, for disposition in the slots, also serves the additional purpose and function of supporting and locating or positioning the body of magnetizable material in appropriate position to enable that magnetizable material to serve as an auxiliary magnetic path for the harmonic flux field components, and to divert those harmonic components and to confine them to a path where they will be ineffective to cause harmful effects.

The insulating material is frequently in the form of a roll of plastic film or tape, a commercial example of which is the tape made by du Pont and sold under the trade-mark MYLAR. This tape may be treated to cement thereto finely divided magnetic particles of relatively high permeability and low magnetic retentivity, commercially available in various forms as magnetic iron, iron alloys, or ferrites. This construction permits the tape, which is easily handled, to serve as a carrier for the magnetizable material, and permits the placement of the magnetizable material to be easily accomplished while placing the tape in the usual conventional procedure.

The magnetizable material may take any form which will present a cross-sectional area that will be substantially saturated by the harmonic flux components of the magnetic field that will be developed by the related coils or coil sides. Thus the magnetic material may be one or more layers of thin magnetizable foil, continuous or in spaced strips, or a layer of finely divided particles, or a woven fabric of magnetizable threads, or any other structural form that will present a saturable cross-sectional area to the unwanted harmonic flux components.

For high-temperature operation, the insulating base material may be a strip or layer of asbestos, or equivalent material, with the magnetizable material consisting of magnetic filaments or fabric supported on or in the asbestos layer or strip, or consisting of one or more imprints of magnetic ink on the insulating base material. Similarly, the magnetic particles or foil may be attached or bonded to the base insulating material by any suitable cement or bonding agent that will tolerate the operating temperatures.

This form of insulating material combined with the harmonic flux diverting magnetizable material is described and claimed in my co-pending application Serial No. 51,696, filed June 25, 1963. As there described, the combination of insulation and magnetic material is of utility in various forms and applications in electromagnetic devices and in dynamo-electric apparatus.

Thus, the insulation directly applicable to slots and windings may include a tape type of insulation for wrapping a winding or for lining a slot. In dynamo-electric machines of larger capacity, the slot liners may be self-supporting fiberboard liners between windings and core or between windings of separate phase in one slot. In such applications, the harmonic fluxes are kept from affecting the core and tooth edges that border a slot, and and also serve to prevent inductive flux interlinkage between the separate winding that may occupy the same slot in common.

In the construction of the tachometer in which the windings are on opposite sides of the air gap, slot wedges may be employed to prevent harmonic fluxes from entering or crossing the gap which would otherwise cause undesired harmonic inductive effects between the windings by transfer into and through the rotatable cup.

The objects of the invention are thus similarly achieved in both modifications, in which the tape or other insulating material may be disposed in usual manner to line a slot to provide insulation between the lamination edges at the slot and the wires or conductors to be placed in the slot, or the slot wedges with magnetizable material may be employed to close the slots and thereby prevent harmonic flux movement into and across the air gap.

The manner in which the invention is applied is illustrated in connection with a tachometer generator having two spaced cores, as shown in the accompanying drawings, in which FIGURE 1 is a perspective view of a tachometer generator, with the rotatable non-magnetic induction rotor cup shown axially withdrawn from its normal position in the air gap between two concentric cores for the respective windings;

FIGURE 2 shows the windings of the motor and tachometer generator schematically;

FIGURE 3 is a schematic development of opposite portions of the two cores and shows the relative disposition of the two windings, and their end turns, and the approximate disposition of the paths and the turbulent effects of the harmonic fluxes;

FIGURE 3-A is a view similar to FIGURE 3 showing the absence of magnetic turbulence effects in the core and teeth after the application of saturable magnetic foil around the coil sides in accordance with the invention;

FIGURE 4 is a schematic sectional view of end portions of the two cores and the rotor cup and the end turns of two opposite coils, to indicate a typical path and arrangement of leakage fluxes between the end turns of opposite adjacent coils of the two windings, as a result of the magneto-motive forces set up in the end face surfaces of the teeth of the outer laminations;

FIGURE 5 is a graph showing the square wave or step form of the magnetic flux field generated by the primary winding coils when energized;

FIGURE 6 is a graph showing the first three terms of a Fourier series expansion mathematically defining the rectangular step wave in the figure;

FIGURE 7 is a graph showing the trapezoidal form of the flux field under conditions of the load, or output in the secondary winding, and shows the spike impulse at the end of the flux field form;

FIGURE 8 is a graph showing the equivalent spike termination on the trapezoidal flux wave of FIGURE 7 as a unit impulse;

FIGURE 9 is a schematic sectional view of a pair of slots, to show how the magnetic foil is disposed around the coil sides to provide a confining path for the harmonic flux components; and FIGURE 10 is a schematic view of a tachometer generator in which both windings are on the same core structure.

As shown in FIGURES 1 and 2 of the drawings, a conventional tach generator 20, of a type modified according to this invention, comprises a primary core 21 and a secondary core 22 spaced from the primary core to define an air gap 23 in which a rotor cup 24 is rotated by a motor 25.

The primary core 21 supports a primary winding 26 and the secondary core supports a secondary winding 27. As indicated in FIGURE 2, the secondary winding 27 is disposed to be in electrical quadrature relative to the primary winding 26. It is desired that no electromotive force shall be induced in the secondary winding 27 from the primary winding 26 when the cup 24 is stationary. However, when the cup is rotated in the air gap 23, it is to be effective to transfer energy inductively from the primary winding 26 to the secondary winding 27.

Each of the two windings 26 and 27 consists of several coils in series, which are disposed on their respective cores in the manner shown in FIGURE 3, showing a development of the core and winding arrangement. The relative direction of coil turns is well known.

In such conventional tachometer generator, in the absence of the present invention, the harmonic flux components of the magnetic flux field generated by the primary winding 26, as in FIGURE 3, will establish a saturated condition along the slot edge surfaces of the teeth, as at 30, on the laminations of tooth 31, for example, and along the slot core body, as at 32, adjacent the coil sides 33, as in slot 34, for example, in FIGURE 3. To illustrate this condition, part of the outer end lamination 35 is broken away, in FIGURE 3, to expose the next lower lamination 36, both in tooth 31 of core 21, and related as shown more clearly in FIGURE 4. This saturated condition in slot tooth edge and in slot core body edge is established by the coil slides 32 in the slots.

The end turns 37 of the coils similarly affect the outer or end lamination 35. The outer surface 38 of that outer end lamination 35 becomes magnetically saturated, as indicated in FIGURES 3 and 4. The magneto-motive force established by the end turns 37 supports the harmonic flux components to similarly saturate the outer surface 39 of the outer end lamination 41 of the aligned tooth 42 in the upper or secondary core 22. The leakage flux between the two cores is generally indicated by flux lines 43.

The depth of saturation is a function of the thickness of the lamination and of the amplitudes of the harmonic flux components as related to the relative amplitude of the corresponding term of the pertinent Fourier series that defines the flux wave form function. Thus, the content and values of harmonic flux components may vary under load, according to the change in shape of the flux field wave form.

For example, as previously indicated, a slot and tooth structure with distributed coils, as in FIGURE 3, will generate a step wave flux field, of the form 45 in FIGURE 5, which contains a series of harmonic components as defined by the corresponding Fourier series expansion for the mathematical function represented by a graph of the same shape as the flux field. In FIGURE 6 the first three flux wave components 46, 47 and 48, only are shown, corresponding to the first three terms of the Fourier series expansion, representing the fundamental, the third harmonic and the fifth harmonic. The further terms are not shown, although necessarily present.

The square or step wave 45 of FIGURE 5 represents the flux wave at no-load, while the rotor cup is at standstill. When the rotor cup begins to rotate and attains a substantial speed, the generator 20 becomes loaded, and the flux field wave form changes to the trapezoidal form 50 shown in FIGURE 7. When the harmonics combine to form this trapezoidal form of flux wave 50, the effect is equivalent to a super-position of a ramp function 51 on a step 52 of reduced amplitude. The added feature, of importance here, is the formation of the spike 55 at the end of the ramp function 51. (See Goldman: "Frequency Analysis, Modulation and Noise," 1948, McGraw Hill, pages 30–32.)

The spike 55, in its action, is essentially a unit impulse shown at 60 in FIGURE 8. The unit impulse has a special effect between the adjacent end turns of the opposite primary and secondary windings. The impulse is of sufficiently high frequency to enable and to cause the end turns of the primary winding to act as short radiating dipole antennas.

The end turns 37 of the primary winding thus transmit energy in two undesirable forms to the secondary winding. First, the leakage induction is transmitted in the manner shown in FIGURE 4. In terms of antenna theory, this leakage flux may be considered to be near-field effect. Here the air path dimensions are significant and limit the leakage flux. Second, the spike and impulse effects establish the far field effects. Then the air path or space between the end turns of adjacent coils of opposite windings is not material, since the energy pulses are radiated.

Thus in conventional constructions of tachometer generators, spurious or leakage energy is transmitted from the primary winding to the secondary winding through the core by magneto-motive force action and consequent leakage through the iron, and also by similar end-turn leakage and radiation. Such spurious and leakage energy manifests itself in false but substantial so-called "zero error" or "null voltage" in the secondary winding, although the rotor cup 24 is actually at standstill, and no voltage should be in the secondary winding.

In the absence of any such spurious induction effects between the primary winding 26 and the secondary winding 27, the rotor cup 23 would accurately induce in the secondary winding 27 an electro-motive force that is substantially a direct linear measure of the angular speed of the cup 23. When the rotor cup 23 is rotated, it induces into the secondary winding 27 a voltage in electrical quadrature with the voltage across the primary winding 26.

However, independently of the energy-transfer effect of the rotor cup 23, which acts solely during rotation, the intermodulation of the harmonic flux components of the electro-magnetic field from the coils of the stationary primary winding 21 establishes a quadrature harmonic component which reaches and energizes stationary secondary winding 27. (See Goldman, cited above, pages 167 et seq.) The energy for such quadrature component is drained from the fundamental by such intermodulation action. Thus, a spurious electrical quadrature electro-motive force is induced in secondary winding 27, that is in no way due to the rotation of the rotor cup 23. Such spurious electrical quadrature electro-motive force exists in the secondary winding 27 under all operating conditions, whether the cup is stationary or is rotating.

As a result, both the desired real quadrature voltage, induced by the cup, and the undesired spurious quadrature voltage caused by harmonic intermodulation are present in the secondary winding. The real quadrature voltages and the spurious quadrature voltages are algebraically additive, and are difficult to separate when once combined.

However, by the principles of this invention, the undesirable spurious quadrature induction effect is prevented from combining with the true quadrature voltage, and is kept out of the secondary winding 27, so only the true quadrature voltage is present in the secondary winding 27.

The intermodulation between the harmonic flux components and the fundamental flux component is prevented by confining the harmonic flux components to a limited magnetic path which is isolated from the path for the fundamental flux component.

The manner in which such intermodulation is prevented by this invention may now be better realized upon referring to FIGURE 9 which shows the treatment of a set of coil sides in a slot.

As shown in FIGURE 9, a bundle of coil sides 60, in the circuit of primary winding 26, is disposed in a slot 61 between two teeth 63 and 64. A layer or wrapping of paper or fabric 65 is provided to encircle the coil sides after all the coil turns are dropped into the slot 61.

On the outside of the paper or fabric wrapper 65 is a layer or wrapper of magnetizable metal foil 70 to constitute a short confining magnetic path for the harmonic flux components of the flux field to be induced by the coil sides when the primary winding is energized. In an actual generator, the slots are tightly packed with coil sides, paper and foil. The two slots show the general arrangement of paper and foil during and after application. The foil 70 is softly magnetizable material with minimum retentivity, and is commercially available in thicknesses of 0.001 inch or less. The total cross-section of the wrapping of foil, in one or more layers, is such as to be saturable by the harmonic flux components. Under such conditions, the foil presents a path of low permeability to the fundamental flux, which then seeks its path of high permeability as if the foil were not there.

In the absence of the foil 70, the harmonic fluxes magnetize the slot wall surfaces, representing a partial depth into the teeth, as shown in FIGURES 3 and 4. Consequently, the effective tooth width is reduced and the flux density of the fundamental flux component increased. Consequently, the necessary magnetizing current is increased for the fundamental flux component, with a corresponding increase in magnetizing current for the harmonics themselves, since the Fourier ratios always have to be maintained.

The foil 70, however, when disposed in the slot, between coil turns and teeth or core, absorbs the harmonic fluxes and confines them to the path in the foil. The beneficial results are reduction in magnetizing current and increased efficiency, but mainly prevention of intermodulation and prevention of leakage and transfer of spurious energy to develop a spurious quadrature voltage in the secondary winding. This feature of eliminating the false quadrature voltage is of prime importance since the tachometer generator is to serve as a measuring instrument of high accuracy.

Thus, by this invention the foil serves to separate the spurious electrically initiated quadrature voltage from the real quadrature voltage mechanically initiated by the rotating rotor cup 23. By this single expedient, the foil also keeps the spurious quadrature voltage out of the secondary winding and eliminates the spurious "zero error" or "null voltage" heretofore compromisingly accepted as a necessary evil in the operation of a tachometer generator.

Referring back now to FIGURE 3A, the same structure as of FIGURE 3 is shown, but with the coils enwrapped and protected by a magnetically closed wrapping of one or more layers of magnetizable thin foil 70. For the present application, where maximum accuracy is sought, the coil turns of the entire coil are preferably encircled by the foil wrapping in one or more layers at different parts of the coil, as, for example, on the coil sides in the slots, and on the end turns beyond the laminations. The flux density and the total flux will be different in those two regions and different cross-sectional areas of the foil may be appropriate to absorb and become saturated by the harmonic flux components of the field. The teeth and cores and end laminations are free of the magnetic turbulence which characterizes the conventional structure depicted in FIGURE 3. Although the application of the foil to the primary alone will prevent the transmission of false signals in the first instance, similar application of foil to the secondary also will serve to prevent regeneration of harmonics by the secondary winding.

The core arrangement shown in FIGURES 3 and 3–A, with windings on separate cores, spaced by the air gap, is one form of tachometer generator. As initially mentioned, another form, as in FIGURE 10, has a single core 81 to support both windings 82 and 83 in electrical quadrature space disposition, with an air gap 84 separating the core 81 and a flux return element 85 to accommodate a rotor cup 86. The coil arrangement corresponds to the dropping of the secondary winding coils 27 down onto the core 21 of the primary in the corresponding relative positions shown in FIGURES 3 and 3–A.

As shown in FIGURE 9, the foil 70 is shown in contact with the edges of the laminations at the slot. It will be understood, of course, that an insulating liner may be employed between the foil and the core. By use of the magnetic tape of my co-pending application Serial No. 51,696 filed June 25, 1963, previously referred to, the insulating liner is placed in position together with the magnetizable matter functionally corresponding to the foil, all in one operation, to place the magnetizable material between the insulation wrapping 65 and the insulation base of the magnetic tape. Thus, in the slot in FIGURE 9, such magnetic tape would have a layer of insulation between the core 64 and the magnetizable material on the tape. Also, at the overlap of the tape, the insulation base would provide a slight dielectric spacing between the magnetizable material at the overfolded parts of the magnetic tape.

A modification of FIGURE 9 could be achieved, with the omission of the foil 70, leaving the winding conductors 60 wrapped with the insulation 65, and the use of a magnetic wedge as disclosed in said co-pending application Serial No. 51,696, filed June 25, 1963. The magnetic layer or content of the wedge would provide a magnetic bridging path between the adjacent tooth edges, at the mouth of the slot, to conduct the harmonic magnetic flux components and thereby keep them out of the air gap and thus prevent interlinkage with the cup.

It is intended herein that reference to foil, as the material to establish the auxiliary magnetic path for the harmonic flux components, shall also include magnetic material in other forms, such as powders, magnetic printing ink, or magnetic strips or filaments cemented or secured to or woven into tapes or fabrics.

The invention herein thus provides a simple construction for and method of eliminating the harmful effects of harmonic fluxes in a tachometer generator, so the "zero error" voltage or "null" may be eliminated. The high cost of testing and compensating tachometer generators is thus also eliminated, and increased accuracy is directly obtained in a production device.

The general arrangement and details of construction of the tachometer generator, and the construction and disposition of the magnetic material for diverting, guiding and confining the harmonic flux components, may be variously modified within the scope of the invention without departing from the spirit and scope of the claims.

What is claimed is:

1. a tachometer generator to operate around an axis of rotation, and comprising
    (a) a cylindrical stator core disposed concentrically about the axis, and supporting
        (1) an input winding to be energized from an external source, and
        (2) an output winding to be inductively energized from said input winding;
    (b) a cylindrical magnetic flux return concentrically disposed around said same axis and spaced radially outward from the stator core to define a concentric cylindrical gap between the magnetic flux return and the stator core;
    (c) a co-axial drive shaft;
    (d) a rotor cup supported on the drive shaft and disposed to extend concentrically into said gap, to be rotated by the shaft to transfer energy from the input winding to the output winding first by inductive reaction between the magnetic flux field from the input winding and the cup, and then by inductive reaction between the cup and the output winding; and
    (e) magnetizable means disposed between the input winding and the air gap, said means being responsive to higher harmonic components of the flux field developed by the input winding, and said means serving to confine said harmonic flux components over a part of their magnetic path to a magnetic path shunting the air gap and thus serving to prevent said harmonic flux components from reaching and influencing the rotor cup, thereby to prevent energy from those higher harmonic components from being transferred by the cup and from reaching and affecting the output winding.

2. A tachometer generator comprising
    (a) a primary winding to be energized from an external source;
    (b) a second winding to be inductively energized from the primary winding only under certain operating conditions;
    (c) means adjacent the windings defining an air gap through which the induction magnetic field of the primary winding must pass to be available for transferring energy to the secondary winding;
    (d) a member of non-magnetic material movable in said air gap and effective only during its movement to transfer energy inductively from the primary winding to the secondary winding; and
    (e) magnetizable means disposed between the primary winding and the air gap and serving to divert undesirable harmonic flux components of the magnetic flux field generated by the primary winding when energized, said magnetizable means operating to divert and to conduct and to isolate and to separate said undesirable harmonic flux field components from the desirable flux field generated by the primary winding and made available to the movable member for inductive energy transfer, said magnetizable means serving to direct said diverted undesirable flux components into a path to by-pass the air gap and thereby leave only a desirable component to be transferred by the movable member.

3. A tachometer generator comprising
    (a) an inner cylindrical core concentrically surrounding a main central axis of rotation;
    (b) input and output windings of said inner core;
    (c) an outer cylindrical core surrounding said inner core and concentric therewith about said axis, and said outer core being spaced from the inner core to define a concentric cylindrical air gap, and said outer core serving to complete the magnetic circuit for said inner core;
    (d) a rotatable cup extending into said air gap and operative, upon rotation, to transfer energy by induction from one winding as the input winding to the other winding as the output winding by inductive reaction with the magnetic flux field generated by the input winding upon energization from an external alternating current source; and
    (e) magnetic flux conducting means disposed between the primary winding and the air gap and serving to divert undesirable higher harmonic flux components from the total magnetic flux field as generated by the input winding, to a confining path including said means that does not interlink with the cup or with the output winding.

4. A tachometer generator comprising
    (a) a magnetizable core;
    (b) a primary winding thereon to be energized from an external alternating current source;
    (c) a secondary winding also on the core to receive energy from the primary winding;
    (d) a magnetic flux return spaced from the core by an air gap;
    (e) a rotor cup rotatable in the gap between the core and the magnetic flux return to transfer electromagnetic energy from the primary winding to the secondary winding; and
    (f) auxiliary magnetizable means disposed in close proximity to both windings and between said windings and the air gap, and serving to selectively isolate undesired harmonic flux components and thereby prevent transfer to the cup and to the secondary winding of any energy from the primary winding that is contained in said undesired higher harmonics of the magnetic flux field generated by the input winding.

5. A tachometer generator, as in claim 4, in which the energy-transfer-preventing means that isolates the higher harmonic energy from the total flux field before the field energy reaches the rotor cup, consists of magnetizable material disposed between the windings and the magnetizable core.

6. A tachometer generator comprising
(a) a primary winding to be energized from an external source;
(b) a second winding to be inductively energized from the primary winding only under certain operating conditions;
(c) magnetizable core means adjacent the windings and defining an air gap through which the induction magnetic field of the primary winding must pass to be available for transferring energy to the secondary winding;
(d) a member of non-magnetic material movable in said air gap and effective only during its movement to transfer energy inductively from the primary winding to the secondary winding; and
(e) auxiliary magnetizable means disposed between said windings and said core means for preventing magnetic flux interlinkage between the member of non-magnetic material and the two windings by the higher harmonics of the magnetic flux field as generated by the primary winding.

7. A tachometer generator, as in claim 6, in which the auxiliary magnetizable means (e) consists of a magnetizable flux barrier between the cup and the two windings, the flux barrier having such physical and magnetic parameters as to become saturated by the higher harmonic content of the magnetic flux field as generated by the primary winding.

8. A tachometer generator, as in claim 6, in which the auxiliary magnetizable means consists of a thin foil of magnetizable material encircling the active coil sides of each coil in the slots.

9. A tachometer generator, as in claim 6, in which the auxiliary magnetizable means consists of a thin foil of magnetizable material encircling the active coil sides of each coil in the slots, and also encircling the end connections between the coil sides.

10. A tachometer generator, as in claim 9, in which the auxiliary magnetizable material becomes saturated by the harmonic flux components and the leakage flux of the end turns.

11. A tachometer generator to operate around an axis of rotation, and comprising
(a) a cylindrical stator core disposed concentrically about the axis and supporting
(1) an input winding to be energized from an external source, and
(2) an output winding to be inductively energized from said input winding;
(b) a cylindrical magnetic flux return concentrically disposed around said same axis and spaced radially outward from the stator core to define a concentric cylindrical gap between the magnetic flux return and the stator core;
(c) a co-axial drive shaft;
(d) a rotor cup supported on the drive shaft and disposed to extend concentrically into said gap, to be rotated by the shaft to transfer energy from the input winding to the output winding first by inductive recation between the magnetic flux field from the input winding and the cup, and then by inductive reaction between the cup and the output winding; and
(e) means for confining the energy of the harmonic flux components and of the leakage flux of the flux field developed by the input winding, said confining means constituting a magnetizable shell disposed between the input winding and the stator core, and serving to keep said harmonic flux components from entering the air gap and from influencing the rotor cup.

12. A tachometer as in claim 11, in which the confining means constitutes a close magnetizable shell saturable by the harmonic flux components of the flux field of the input winding.

13. A tachometer generator comprising
(a) a primary winding to be energized from an external alternating voltage source;
(b) a secondary winding disposed in electrical quadrature inductive relation relative to the primary winding;
(c) a rotor rotatable in a prescribed path to be traversed by the magnetic flux field generated by the primary winding while it is energized, said rotor being intended to be the sole medium for transferring energy inductively from the primary winding to the secondary and only while said rotor is rotating;
(d) and magnetizable foil encircling all portions of the primary winding that are positioned to establish a magnetic flux field across the path to be traversed by the rotor.

14. A tachometer generator, as in claim 13, in which the magnetizable foil (d) becomes magnetically saturated by harmonic magnetic flux components in the flux field generated by the primary winding.

15. A tachometer generator comprising
(a) a primary stator core provided with a series of slots spaced symmetrically angularly about a central axis;
(b) a secondary stator core provided with a series of spaced slots also symmetrically angularly spaced around said axis, and said secondary core being spaced from the primary stator core by a narrow symmetrical air gap concentric with said axis;
(c) a multi-coil input winding symmetrically distributed in the slots of the primary core, and to be energized from an external alternating voltage source;
(d) a multi-coil output winding symmetrically distributed in the slots of the secondary core and angularly shifted relative to the primary winding so the two windings are in electrical time quadrature relation;
(e) a co-axial rotatable shaft;
(f) a rotor of non-magnetic material secured to the shaft to be driven thereby and disposed concentrically in the air gap between the two cores to transfer energy from the primary winding into the secondary winding by induction in time quadrature only during rotation of the rotor;
(g) and means consisting of magnetizable foil wrapped around the coil sides of the input winding to serve as a restricting path for harmonic electro-magnetic flux components in the flux field developed by the input winding when energized.

16. A tachometer generator as in claim 15, in which the magnetizable foil becomes saturated by the harmonic flux components.

17. A tachometer generator as in claim 15, in which the foil is wrapped around the entire coil including coil sides and end turns, and is of limited cross-sectional area to be saturable by the harmonic flux components and leakage flux.

No references cited.

MILTON O. HIRSHFIELD, *Primary Examiner*.